(12) United States Patent
Hecht et al.

(10) Patent No.: US 9,156,171 B2
(45) Date of Patent: Oct. 13, 2015

(54) GRIPPER

(71) Applicant: GLP Systems GmbH, Hamburg (DE)

(72) Inventors: Robert Hecht, Seehausen (DE); Christian Ladda, Hamburg (DE)

(73) Assignee: GLP Systems GmbH, Hamburg (DE)

( * ) Notice: Subject to any disclaimer, the term of this patent is extended or adjusted under 35 U.S.C. 154(b) by 0 days.

(21) Appl. No.: 14/396,416

(22) PCT Filed: Apr. 8, 2013

(86) PCT No.: PCT/EP2013/057309
§ 371 (c)(1),
(2) Date: Oct. 23, 2014

(87) PCT Pub. No.: WO2013/164160
PCT Pub. Date: Nov. 7, 2013

(65) Prior Publication Data
US 2015/0151438 A1    Jun. 4, 2015

(30) Foreign Application Priority Data

May 2, 2012    (EP) ..................................... 12166334

(51) Int. Cl.
*B25J 15/10* (2006.01)
*B25J 15/08* (2006.01)
*B25J 15/02* (2006.01)
*B25J 15/00* (2006.01)

(52) U.S. Cl.
CPC ............ *B25J 15/086* (2013.01); *B25J 15/0004* (2013.01); *B25J 15/0028* (2013.01); *B25J 15/026* (2013.01); *B25J 15/106* (2013.01)

(58) Field of Classification Search
CPC ...... B25J 15/026; B25J 15/086; B25J 15/103; B25J 15/106; B25J 15/0028; B25J 15/0004
USPC ......................................... 294/119.1; 901/38
See application file for complete search history.

(56) References Cited

U.S. PATENT DOCUMENTS

| | | | | |
|---|---|---|---|---|
| 4,623,183 A * | 11/1986 | Aomori | ......................... | 294/86.4 |
| 4,765,669 A * | 8/1988 | Meier | ........................ | 294/119.1 |
| 4,828,276 A * | 5/1989 | Link et al. | ....................... | 279/33 |
| 5,215,507 A * | 6/1993 | Bonig | ............................ | 475/331 |
| 5,884,951 A * | 3/1999 | Long et al. | .................... | 294/86.4 |
| 2011/0089709 A1 * | 4/2011 | Neeper | ........................ | 294/119.1 |

FOREIGN PATENT DOCUMENTS

| DE | 242589 | 4/1987 |
|---|---|---|
| DE | 102010019348 | 11/2011 |

(Continued)

*Primary Examiner* — Dean Kramer
(74) *Attorney, Agent, or Firm* — Sand & Sebolt

(57) ABSTRACT

A gripper for manipulating tube-shaped specimen cups having a gripper base, at least two gripper fingers each comprising a retaining section for clutching a specimen cup and being arranged to rotate relative to the base about a finger rotation axis. The retaining sections are arranged acentrically relative to the associated finger rotation axis. A first drive twists the fingers. The fingers are coupled to each other so that they are driven by the drive at the same time and with the same rotation speed and direction. A second drive is provided for twisting the base relative to the base body. A control unit controls the drives such that by a movement combination of twisting the fingers relative to the base and twisting the base relative to the base body for each of the retaining sections of the fingers in each case an essentially linear movement relative the base body results.

10 Claims, 2 Drawing Sheets

(56) References Cited

FOREIGN PATENT DOCUMENTS

| DE | 102010019348 A1 | 11/2011 |
|---|---|---|
| EP | 0170479 | 2/1986 |
| EP | 2390068 | 11/2011 |
| FR | 2436650 | 4/1980 |

* cited by examiner

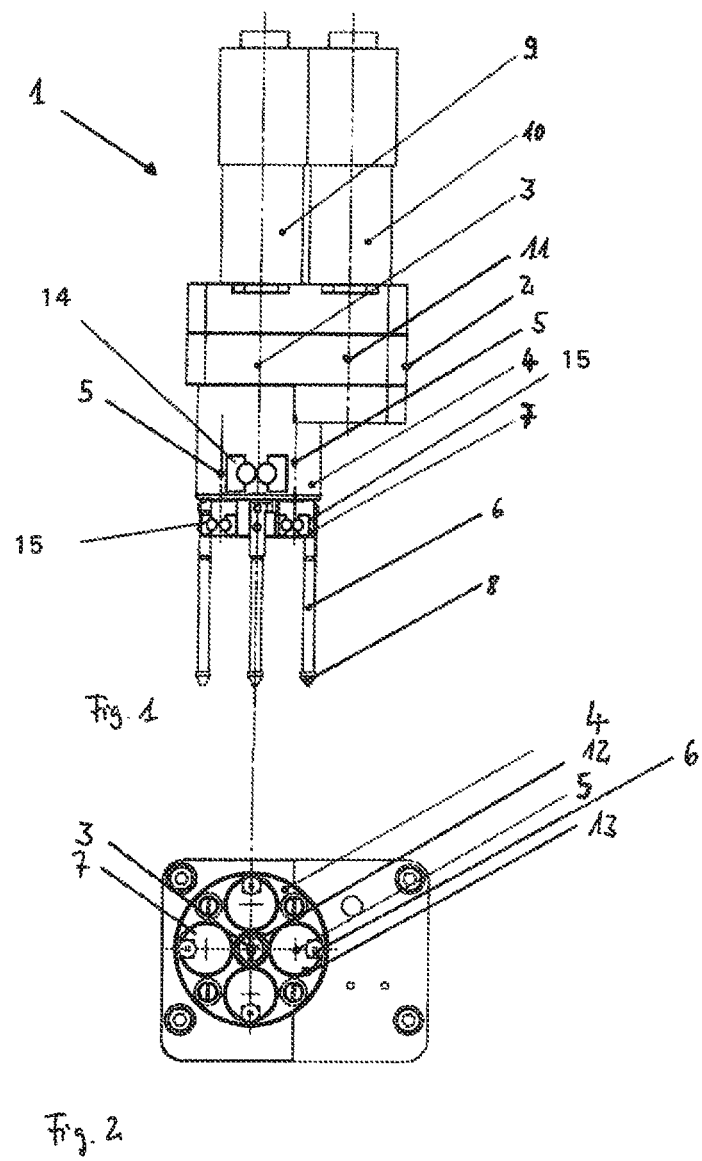

GRIPPER

TECHNICAL FIELD

The invention relates to a gripper for manipulating, in particular, tube-shaped specimen cups, having a gripper base, at least two gripper fingers which each have a retaining section for gripping a specimen cup, and which are each disposed on the gripper base such that they can be rotated relative to the gripper base about a finger rotation axis, wherein the retaining sections of the gripper fingers are each disposed such that they are acentric relative to the associated finger rotation axis and a first drive for twisting the gripper fingers, wherein the gripper fingers are coupled to one another in such a way that they are driven by the drive at the same time and with, in each case, the same rotational speed and direction.

PRIOR ART

In the automated analysis of specimens contained in specimen cups, gripping and relocating these specimen cups individually and mechanically is known, to which end, appropriate grippers and manipulation devices such as manipulation robots are used. Laboratory medicine in particular is especially noteworthy as an example of this, in which tube-shaped specimen cups containing blood samples, urine samples or other tissue samples that have been dissolved or that are in solid form are processed with a high degree of automation and in particular, are fed into the respective specific analytic apparatus and are later transferred to storage.

In this case, it is particularly common, in fields in which a plurality of specimens disposed in specimen cups must be put through, for these specimen containers to be disposed in specimen cup holders such that they are tightly packed for storage and/or transport, for example on specimen trays or so-called specimen racks, on which, for example, test-tube like, tube-shaped specimen cups are disposed with very little spacing between one another in an upright position, the longitudinal axis of the tubes being substantially vertically oriented. In the course of further automated processing, it is necessary to grip a specific, individual specimen cup from this arrangement of specimen cups in a targeted manner using a gripper, and to transfer it to a corresponding analysis apparatus, for example for analysis, or, respectively, to transfer individual specimen cups to a transport system.

In so doing, the problem arises that, due to the tightly packed arrangement of the individual specimen cups, there is little space available for the gripper between the specimen cups, into which the gripper fingers can be inserted in order to grip the specimen cup, and in which said gripper fingers can move. In addition, the space in corresponding manipulation devices is limited overall, which is why the gripper itself must typically have small dimensions.

Known grippers have linear drives for the gripper fingers, which linear drives require a comparatively large installation space, and thus require grippers that are large and that exclude manipulator devices that conform to a largely compact and minimized design.

Alternatively, other types of grippers work using tilting or pivoting movements of the gripper fingers or, respectively, of the retaining sections thereof. DD 242589 A1 discloses such an example of a known gripper. There, individual gripper fingers are mounted with the rear ends thereof in a rotatable gripper mount and a central section of the gripper finger is guided through an opening on the gripper base. The gripper fingers have retaining sections at their free ends. By rotating the gripper mount, the gripper finger is tilted about the central section thereof, which is located in the duct through the gripper base. According to one embodiment shown in FIGS. 3 and 4, this tilting movement can be made linear in an approach movement through a corresponding slot-type guide. Nevertheless, what still remains is an approach movement of the gripper finger, which is guided in an arc in a plane that intersects the finger longitudinal axis, the result of which is that not only is radially acting pressure force exerted on the gripped objects, but also a transversely oriented shear force, when the gripper fingers are resting on the surface of the object that is to be gripped. Such shear force not only reduces the holding force, which only results for the force component that acts perpendicular to the surface of the object that is to be gripped, but also leads to the risk that the gripper fingers may slip from the object that is being gripped, as well as to the risk of damage due to shearing.

A gripper designed is disclosed in DE 10 2010 019 348 A1. There, synchronized rotational movement of individual gripper fingers having retaining sections that are disposed such that they are acentric relative to the respective rotational axis, is produced by means of a pressure piston having thread guides formed therein, which pressure piston can be moved in a cylinder, said rotational movement producing a rotatory approach movement of the retaining sections of the gripper fingers to an object that is to be gripped. There is a disadvantage to such an approach movement, in particular when the space that is available for gripping a specimen cup is limited. This is due to the fact that the rotatory approach movement of the retaining sections of the gripper fingers is a wide sweeping movement in which, for example, holding fingers that are inserted between specimen cups that are tightly arranged in a specimen rack can collide with specimen cups that are adjacent to the specimen cup that is to be gripped. Furthermore, the purely rotatory arrangement of the retaining sections of the gripper fingers again produces a shear force that is transverse to the desired radial holding force, which is exerted on the object that is to be gripped, thus the specimen cup, and thereby has the above-mentioned disadvantages.

SUMMARY OF THE INVENTION

Here, a remedy is to be created by the invention and a gripper of the above specified type suggested, which, with little structural installation space, allows specimen cups to be gripped even under limited spatial conditions, and in addition, which makes it possible to securely grip the specimen cups with a radially oriented clamping force and without the exertion of shear forces.

This object is achieved by means of a gripper for manipulating, in particular, tube-shaped specimen cups, having the features of a gripper base, at least two gripper fingers which each have a retaining section for gripping a specimen cup, and which are each disposed on the gripper base such that they can be rotated relative to the gripper base about a finger rotation axis, wherein the retaining sections of the gripper fingers are each disposed such that they are acentric relative to the associated finger rotation axis; a first drive for twisting the gripper fingers, wherein the gripper fingers are coupled to one another in such a way that they are driven by the drive at the same time and with, in each case, the same rotational speed and direction, characterized in that the gripper base is disposed on a base body and can be rotated relative to this base body about a base rotational axis that differs from the finger rotation axes, in that a second drive is provided for twisting the gripper base relative to the base body, and in that a control unit is provided for controlling the drives in such a way that, through a combination of movements comprising a rotation of the gripper fingers relative to the gripper base and a rotation of the gripper base relative to the base body for each of the retaining sections of the gripper fingers, in each case, a substantially linear movement relative to the base body results. Advantageous refinements of such a gripper according to the invention are provided such as the finger rotation axes and the base rotational axis each lie parallel to one another in pairs. Furthermore, the base rotational axis is disposed between the retaining sections of the gripper fingers at the same distance therefrom. The gripper has three or four gripper fingers. The retaining sections of the gripper fingers are disposed at the same angular distance about a central point, which is the imaginary origin of the essentially linear movement of the retaining sections, and are disposed at the same distance from this central point. The first drive is coupled to a drive shaft, which drives the gripper fingers for twisting about the finger rotation axes by means of a planetary gear assembly, wherein a sun gear having circumferential gearing is disposed on the drive shaft, which sun gear meshes with planetary gears having circumferential gearing, which are connected to the gripper fingers. The planetary gears are formed having the same diameter and the same circumferential gearing. The drives each have a motor having position and speed control. The shafts provided for the rotation of the gripper fingers and gripper base are supported on ball bearings. The control unit is further set up for such control of the first and the second drive such that these drives work together for a rotation of the gripper base relative to the base body, while at the same time retaining the placement of the retaining sections along an imaginary linear movement path.

Thus according to the invention, a gripper that corresponds to the prior art, in particular a gripper according to DE 10 2010 019 348 A1 comprises the following:
 a gripper base;
 at least two gripper fingers, which each have a retaining section for gripping a specimen cup, and which are each disposed on the gripper base such that they can be rotated relative thereto about a finger rotation axis, and in which the retaining sections of the gripper fingers are each disposed such that they are acentric relative to the associated finger rotation axis;
 a first drive for twisting the gripper fingers, wherein the gripper fingers are coupled to one another in such a way that they are driven by the drive at the same time and with, in each case, the same rotational speed and direction;
and is refined by the following features:
 the gripper base is disposed on a base body and can be rotated relative to this base body about a base rotational axis that differs from the finger rotation axes;
 the gripper has a second drive for twisting the gripper base relative to the base body;
 a control unit is provided for controlling the drives, thus the first and the second drive, in such a way that, through a combination of movements comprising a rotation of the gripper fingers relative to the gripper base and a rotation of the gripper base relative to the base body for each of the retaining sections of the gripper fingers, in each case, a substantially linear movement relative to the base body results.

The core idea of the invention is therefore that, through an overlapping of rotatory movements, namely, on the one hand, a rotation of the gripper fingers having retaining sections that are eccentrically disposed relative to the gripper base and, on the other hand, a rotation of the gripper base in a targeted counteracting manner, a resulting movement of the retaining sections of the gripper fingers is achieved, which is linear relative to the base body of the gripper. Since typically, the base body of the gripper remains positioned such that it is stationary relative to the specimen cup that is to be gripped during the manipulation of the tube-shaped specimen cups, a linear approach movement of the retaining sections of the gripper fingers to the specimen cup or, respectively, a corresponding linear movement in the opposite direction in order to release a specimen cup that has been gripped, therefore results. In this way, through the combination of two rotational drives, which can be implemented using simple means and which can be compactly housed, a linear movement of the retaining sections of the gripper fingers is achieved, which movement with corresponding linear drives could only have been achieved with a design that would take significantly more space. In particular in the case of more than two gripper fingers, either a linear drive would have to be provided for each finger, which would increase the number of drives needed and the complexity of the control provided therefor, or a correspondingly complex kinematics would have to be created by means of a drive force, which would be transferred via the corresponding drives to the appropriate linear actuating drive, for example. In contrast to such a solution, using simple devices that are comparatively cost-effective to construct, the invention thus makes it possible to create a gripper having a resulting linear approach movement of the retaining sections of the gripper fingers, the respective drives of which operate in a purely rotatory manner. By implementing the resulting movement of the retaining sections of the gripper fingers as a linear movement, these movements are far less space consuming when compared to the purely rotatory approach movement in the prior art pursuant to DE 10 2010 019 348 A1, and therefore can be performed in a targeted manner and without any risk of collision with adjacent specimen cups, even in the region of tightly placed specimen cups, for example in a tight arrangement of specimen tubes on a specimen rack. The retaining sections of the gripper fingers can also be lined up purely radially, thus perpendicular to a surface of the object that is to be gripped, such as that of a specimen cup for example, without tilting or pivoting movements, and the without transversely-acting factors. This results in secure gripping with good and well-defined holding forces that only act to hold.

The drives for the two rotational movements, namely a rotation of the gripper fingers and a rotation of the gripper base, can essentially also be implemented with one drive motor and a corresponding distribution of the drive force generated thereby to the two drives (in this case, to be understood as a drive train) by means of a corresponding drive configuration, for example. Separate drive motors are preferably to be used, however, since the mechanics thereof are simpler.

The control unit for the appropriate coordination of the two drives, on the one hand for the rotational movements of the gripper fingers, and on the other hand for the correlated rotational movement of the gripper base, can essentially be a control unit implemented by means of a mechanical transmission coupling. However since such a transmission coupling requires considerable design effort and a considerable amount of installation space, an electronic control of two separate drive motors is preferred here. In addition, such an electronic control allows a significantly greater degree of freedom in each of the combined movements that are to be performed and in a resulting movement of the gripper fingers or, respectively, the retaining sections thereof, that is to be adjusted. Thus by means of such a control, in particular when the mechanics of the rotation of the gripper fingers is coupled to the gripper base and in the case of a corresponding rotation of the gripper base, a rotational movement of the gripper fingers is obtained, as may be the case for example in an implementation with the help of a planetary gear assembly, a resulting movement may also be achieved by means of a corresponding coupled movement, in which the gripper base is rotated relative to the base body with a correspondingly controlled counter movement of the gripper fingers or, respectively, of the retaining sections relative to the gripper base, so that these retain a gripping position on a specimen cup and therefore, a specimen cup can be rotated along with the gripper base without the grip being lost. This is advantageous, for example when a specimen cup that has been provided with a corresponding identification label, for example one with an applied bar code, must be rotated in front of a reading head of an identification device in order to read the corresponding identification code. Thus, for example, a specimen tube that has been provided with a bar code is rotated about its longitudinal axis in front of a bar code scanner using the gripper according to the invention in order that the bar code disposed on the specimen tube can be read by the bar code scanner.

In addition, with the linearly adjusted approach or, respectively, release movement, the gripper according to the invention provides the advantage that a specimen cup can be seized using a holding force that is exerted perpendicular to the surface (in particular in the case of tube-shaped specimen cups), which holding force contains no transversely oriented shear force components. Such gripper forces, which are oriented purely perpendicular to the surface plane of the specimen cup at the point of application require a secure and positionally accurate gripping of the specimen cup without the risk that this specimen cup will be damaged as a result of slipping out of the secure grip due to shear forces or, if applicable, as a result of the shear force components otherwise contained in a gripping force.

The finger rotation axes and the base rotational axis are each advantageously disposed parallel to one another in pairs. This arrangement makes possible a particularly simple implementation of the invention.

For a symmetrical design of the gripper having fingers that are moved symmetrically, it is advantageous when the base rotational axis is disposed between the retaining sections of the gripper fingers at an equal distance therefrom. It is further advantageous when the retaining sections of the gripper fingers each have the same degree of eccentricity relative to the respective finger rotation axis. Furthermore, an especially symmetrical and thus preferable design of the gripper results when, in a starting position, the retaining sections of the gripper fingers are the same distance from the base rotational axis in a projection onto a plane that is perpendicular to the rotational axis, which is in the center of the arrangement.

The gripper according to the invention exerts a secure "grip" in particular when said gripper has at least three gripper fingers. A gripper having four gripper fingers is currently preferred. The retaining sections of the gripper fingers are thereby advantageously disposed at a uniform angular spacing about a central point, which is the imaginary origin of the essentially linear movement of the retaining sections, and are disposed at the same distance from this central point. This results in a symmetrical distribution of the gripper forces on the circumference of the specimen cup and thus, in an especially secure grip.

As already mentioned above, an essentially simple constructional solution and design of the gripper according to the invention is provided when the first drive is coupled to a drive shaft, which drives the gripper fingers for twisting about the finger rotation axes by means of a planetary gear assembly, wherein a sun gear having circumferential gearing is disposed on the drive shaft, which sun gear meshes with planetary gears having circumferential gearing, which are connected to the gripper fingers. As may be advantageously provided, when the planetary gears are formed having the same diameter and the same circumferential gearing, this results in a similar coupling and an identically shaped movement of the individual gripper fingers, thus resulting in a further degree of symmetry of the gripper in its functionality.

In the case of a gripper according to the invention, on the one hand, in order to position and pre-adjust the retaining section correctly, and on the other hand, in order to be able to perform the control needed for a movement that correlates to the desired resulting movement of the retaining sections of the gripper fingers with one another with sufficient precision, it is advantageous when the drives each have a motor having position and speed control. For a further control of a gripper according to the invention, power input sensors may be provided for the motors for example, which sensors detect the increase in the current for the operation of the drives and thereby infer contact of the retaining sections with the specimen that is to be gripped, for example. Using this type of sensor, the gripper according to the invention may be equipped with an automatic stop mechanism, which halts a further approach movement of the gripper fingers or, respectively, of the retaining sections in the direction of the specimen cup that is to be gripped when an increase in the power consumption by the motors indicates that the retaining sections are adjacent to or in contact with the object that is to be gripped. Of course corresponding control mechanisms may be provided by means of other sensors, for example by means of force sensors or the like, which are integrated in the retaining sections of the gripper fingers.

The shafts provided for the rotation of gripper fingers and gripper base are advantageously supported on ball bearings. A corresponding mounting makes it possible for these high forces to be accommodated while maintaining the same, negligibly low frictional resistances. This is important because, for a reliable grip, corresponding holding forces must be exerted on the specimen cups that are to be gripped with the gripper fingers. The corresponding forces must be generated with the drives. In so doing, due to the short lever of the preferably used gear pairs of the planetary gear assembly, the compact design makes it possible to transfer the high forces, which are absorbed by the ball bearings. Moreover due to their precise support, the ball bearings provide finely adjustable positioning of the entire mechanic, which is of significant importance for the combined movement determined by the combination of the two rotatory drives that is controlled by the control unit. The low-friction support also allows a very sensitive transmission of an increase in the resistances or, respectively, the counter forces in the system, so that it is possible to identify, with a very fine tolerance threshold, when the retaining sections come into contact with the specimen cup that is to be gripped, for example as is described above on the basis of increased power consumption by the drive motors.

BRIEF DESCRIPTION OF THE DRAWINGS

Further advantages and features of the invention will become apparent from the following description of an embodiment with reference to the accompanying figures. These are:

FIG. 1, which shows a schematic side view of an exemplary embodiment of a gripper according to the invention;

FIG. 2, which shows a view of the gripper from below; and

BEST METHOD OF EMBODYING THE INVENTION

Figure 3:
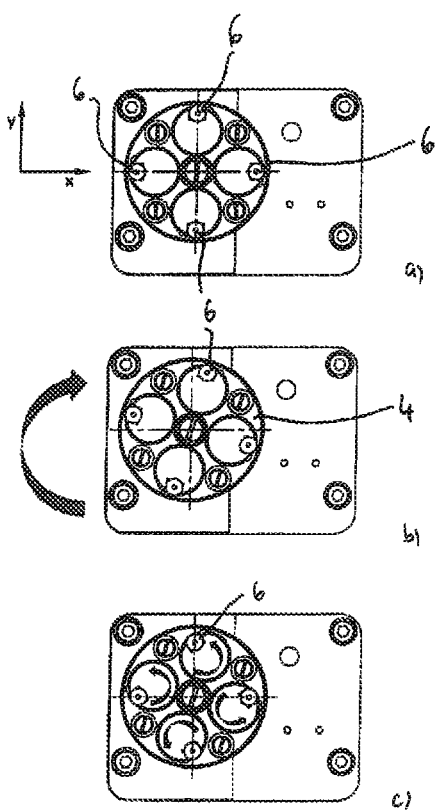
FIG. 3, which shows views of the gripper from below in three different illustrations, a to c, in order to explain the combined kinematics for generating the linear approach movement of the gripper fingers or, respectively, of their retaining sections.

An exemplary embodiment of a gripper according to the invention is shown schematically in the Figures, and without depicting all of the details, and is explained below with reference to the figures.

First, the structural design of the gripper according to the invention will be described with reference to the illustrations in FIGS. 1 and 2. A gripper 1 of the style according to the invention is depicted there. This gripper 1 has a base body 2, on which a gripper base 4 is disposed such that said base can be rotated relative to the base body 2 about a base rotational axis 3. On the other hand, gripper fingers 6 are disposed on the gripper base 4 such that they can be rotated about finger rotation axes 5; in this embodiment, a total of four gripper fingers 6. The gripper fingers 6 extend along a direction that is parallel to the finger rotation axes 5, which in turn are parallel to one another and parallel to the base rotational axis 3. The gripper fingers 6 are disposed on the respective finger bases 7 such that they are acentric relative to the finger rotation axes 5. At their free ends, the gripper fingers 6 retaining sections 8 have radial thickenings, with which the gripper fingers 6 can grip a specimen cup that is to be gripped during operation.

Two drive motors 9 and 10 are permanently disposed on the side of the base body 2 opposite from the gripper base 4. The first drive motor 9 drives a shaft, not depicted here in greater detail, that is run along the base rotational axis 3, whereas the second drive motor 10 drives a shaft that runs parallel to the shaft of the first drive motor, which second shaft, which is likewise not depicted here in greater detail, extends along the drive axis 11.

As can be seen in FIG. 2, situated at the end of the shaft that is connected to the drive motor 9 is a sun gear 12 of a planetary gear assembly, the circumferential gearing of which meshes with planetary gears 13, which are formed at the finger base 7 of each gripper finger 6. The shafts provided for the rotation of gripper fingers 6 and gripper base 4 are advantageously supported on ball bearings 14, 15 (FIG. 1). A corresponding mounting makes it possible for these high forces to be accommodated while maintaining the same, negligibly low frictional resistances. This is important because, for a reliable grip, corresponding holding forces must be exerted on the specimen cups that are to be gripped with the gripper fingers 6. The corresponding forces must be generated with the drives. In so doing, due to the short lever of the preferably used gear pairs of the planetary gear assembly 13, the compact design makes it possible to transfer the high forces, which are absorbed by the ball bearings 14, 15. Moreover due to their precise support, the ball bearings 14, 15 provide finely adjustable positioning of the entire mechanic, which is of significant importance for the combined movement determined by the combination of the two rotatory drives that is controlled by the control unit. The low-friction support also allows a very sensitive transmission of an increase in the resistances or respectively, the counter forces in the system, so that it is possible to identify, with a very fine tolerance threshold, when the retaining sections come into contact with the specimen cup that is to be gripped, for example as is described above on the basis of increased power consumption by the drive motors 9, 10.

Thus a revolution of all of the finger bases 7 in opposite directions is produced by means of a rotation of the sun gear 12, driven by the drive motor 9, in a first direction of rotation. In so doing, the planetary gears 13 of the finger bases 7 are formed having the same diameter and identical circumferential gearing, so that said planetary gears can be driven in a ratio of 1:1 by the sun gear 12 in relation to one another. Here, FIGS. 1 and 2 depict a situation, in which the gripped fingers 6 are opened the least 6, which are thus disposed on the outermost edge of the gripper base 4 in this position and each at a uniform distance from the base rotational axis 3, which runs through the center of the sun gear 12.

A rotation of the gripper base 4 about the base rotational axis 3 can be produced by the drive motor 10. Thus a drive pinion, not shown in greater detail here, is disposed on the drive shaft, which is connected to this drive motor, which drive pinion meshes with a circumferential gearing on the gripper base 4, which circumferential gearing is likewise not depicted in greater detail. Through this design, depending on the operational direction of the drive motor, the gripper base 4 can thus be driven by the drive motor 10 in the one or the other direction about the base rotational axis 3, in the perspective according to FIG. 2, in the clockwise or counterclockwise direction.

Now the functioning and drive kinematics of the gripper 1 according to the invention will be explained with reference to the illustrations in FIG. 3. In three different illustrations, a to c, FIG. 3 shows the gripper base or, respectively, the finger bases and the gripper fingers disposed thereon in different positions. This Figure serves to illustrate the functioning of the rotational movements of the gripper base, which are correlated by means of the control unit, not depicted in greater detail here, belonging to the gripper 1, and the functioning of the finger bases in order to obtain a resulting linear movement of the gripper fingers or, respectively, of the retaining sections thereof, relative to the base body. In order to simplify the explanation, a two-dimensional coordinate system having an x-axis and a y-axis is included in the region of FIG. 3a.

FIG. 3a shows a view according to FIG. 2, in which the gripper fingers 6 in are in the most widely spread position in which they are the furthest from one another.

FIGS. 3b and 3c now illustrate in sequential steps the movements that are coupled together by means of the control unit for the closing of the gripper, i.e. the movement of the gripper fingers 6 towards one another along a linear direction of movement. First, a rotation of the gripper base 4 in the clockwise direction indicated by the arrow is indicated. As a result of this rotation, the gripper fingers move both in the x-direction and in the y-direction, describing an arc as the course of movement.

In order to obtain a linear movement, a counter movement of the finger bases is performed in the counterclockwise direction, driven by the drive motor 10, initiated by the control device and performed simultaneously in addition to the rotational movement of the gripper base 4 in the clockwise direction, as shown in FIG. 3c as a step that has been artificially depicted as separate and illustrated by means of the movement arrows. As can be clearly seen, this counter movement can be controlled such that the gripper fingers 6 remain on the lines that cross one another in the central point of the arrangement of the gripper fingers 6, which lines correspond to the position of the base rotational axis that are shown as cross-hairs in the Figures. A comparison of FIGS. 3a and 3c thereby shows that the gripper fingers 6 have moved in a linear direction in the direction of this center such that the gripper closes with gripper fingers 6 that have been moved linearly. A further movement of the gripper base in the clockwise direction with a repositioning of the finger bases in a counterclockwise direction with correlated drive speeds and travel ranges then leads to a further linear closing movement of the gripper fingers 6. In this way, the gripper fingers 6 are moved towards one another until they grip a specimen cup. A movement in the opposite direction, again correlated between the drive of the gripper base 4 and the drive of the finger bases, results in a linear movement of the gripper fingers 6 away from one another in order to open the gripper. The arrangement of the planetary gear assembly in order to drive the gripper bases ensures that the gripper fingers uniformly move towards or, respectively, away from the center, in which the base rotational axis lies, thus resulting in a symmetrical closing or, respectively, opening path of the gripper fingers or, respectively, the retaining sections thereof.

In a similar manner, by means of a correlated movement of the gripper base 4 and of the finger bases 7 and thus of the gripper fingers 6, it is possible to rotate the gripper fingers at the same distance from the imaginary center relative to the base body, thus a specimen cup that is being gripped can be rotated without this specimen cup being released from the grip of the gripper.

The above description once again makes it clear what advantages and benefits are associated with the gripper according to the invention. In particular it is clear that the gripper can be compactly designed, having grippers that are completely linearly guided and without any tilting or pivoting movements, which avoids shear forces or, respectively, shear factors when gripping a specimen cup, in particular those arising in the grippers of the known design, cited at the beginning, and here results in a secure grip without possible damage to the specimen cup being gripped.

REFERENCE CHARACTERS

1 gripper
2 base body
3 base rotational axis
4 gripper base
5 finger rotation axis
6 gripper finger
7 finger base
8 retaining section
9 drive motor
10 drive motor
11 drive axis
12 sun gear
13 planetary gear

The invention claimed is:

1. A gripper for manipulating tube-shaped specimen cups comprising;
a gripper base;
at least two gripper fingers which each have a retaining section for gripping a specimen cup, and which are each disposed on the gripper base such that they are rotatable relative to the gripper base about a finger rotation axis, wherein the retaining sections of the gripper fingers are each disposed such that they are acentric relative to the associated finger rotation axis;
a first drive for twisting the gripper fingers, wherein the gripper fingers are coupled to one another in such a way that they are driven by the drive at the same time and with, in each case, the same rotational speed and direction, and wherein the gripper base is disposed on a base body and is rotatable relative to this base body about a base rotational axis that differs from the finger rotation axes, in that a second drive is provided for twisting the gripper base relative to the base body, wherein the drives each have a motor having position and speed control; and in that a control unit is provided for controlling the drives in such a way that, through a combination of movements comprising a rotation of the gripper fingers relative to the gripper base and a rotation of the gripper base relative to the base body for each of the retaining sections of the gripper fingers, in each case, a substantially linear movement relative to the base body results.

2. The gripper according to claim 1, wherein the finger rotation axes and the base rotational axis each lie parallel to one another in pairs.

3. The gripper according to claim 1, wherein the base rotational axis is disposed between the retaining sections of the gripper fingers at the same distance therefrom.

4. The gripper according to claim 1, wherein said gripper has at least three gripper fingers.

5. The gripper according to claim 4, wherein the retaining sections of the gripper fingers are disposed at the same angular distance about a central point, which is an imaginary origin of the essentially linear movement of the retaining sections, and are disposed at the same distance from this central point.

6. The gripper according to claim 4, wherein said gripper has four, gripper fingers.

7. The gripper according to claim 1, wherein the first drive is coupled to a drive shaft, which drives the gripper fingers for twisting about the finger rotation axes by means of a planetary gear assembly, wherein a sun gear having circumferential gearing is disposed on the drive shaft, which sun gear meshes with planetary gears having circumferential gearing, which are connected to the gripper fingers.

8. The gripper according claim 7, wherein the planetary gears are formed having the same diameter and the same circumferential gearing.

9. The gripper according to claim 1, wherein shafts provided for the rotation of the gripper fingers and gripper base are supported on ball bearings.

10. The gripper according to claim 1, wherein the control unit is further set up for such control of the first and the second drive, such that these drives work together for a rotation of the gripper base relative to the base body, while at the same time retaining the placement of the retaining sections along an imaginary linear movement path.

* * * * *